United States Patent
Keller, Jr. et al.

(10) Patent No.: US 7,197,652 B2
(45) Date of Patent: Mar. 27, 2007

(54) METHOD AND SYSTEM FOR ENERGY MANAGEMENT IN A SIMULTANEOUS MULTI-THREADED (SMT) PROCESSING SYSTEM INCLUDING PER-THREAD DEVICE USAGE MONITORING

(75) Inventors: Thomas Walter Keller, Jr., Austin, TX (US); Eric Van Hensbergen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 423 days.

(21) Appl. No.: 10/743,369

(22) Filed: Dec. 22, 2003

(65) Prior Publication Data

US 2005/0138442 A1  Jun. 23, 2005

(51) Int. Cl.
*G06F 1/26* (2006.01)
(52) U.S. Cl. ............... 713/320; 713/300; 713/330
(58) Field of Classification Search ........ 713/300, 713/320, 322, 323, 330; 395/556, 750
See application file for complete search history.

(56) References Cited

U.S. PATENT DOCUMENTS

| | | | |
|---|---|---|---|
| 5,148,546 A | | 9/1992 | Blodgett |
| 5,404,543 A | * | 4/1995 | Faucher et al. ............ 713/323 |
| 5,623,647 A | * | 4/1997 | Maitra ....................... 713/501 |
| 6,128,641 A | | 10/2000 | Fleck et al. |
| 6,330,639 B1 | | 12/2001 | Fanning et al. |
| 6,470,443 B1 | * | 10/2002 | Emer et al. ................. 712/205 |
| 6,512,652 B1 | * | 1/2003 | Nelson et al. ........... 360/78.01 |
| 6,622,253 B2 | * | 9/2003 | Bacon ........................ 713/322 |
| 6,657,634 B1 | | 12/2003 | Sinclair et al. |
| 6,704,877 B2 | | 3/2004 | Cline et al. |
| 6,776,787 B2 | | 6/2004 | Green et al. |
| 6,834,353 B2 | | 12/2004 | Smith et al. |
| 6,895,506 B1 | | 5/2005 | Abu-Husein |
| 6,996,441 B1 | * | 2/2006 | Tobias .......................... 700/44 |
| 7,000,130 B2 | | 2/2006 | Adachi |

(Continued)

*Primary Examiner*—Thomas Lee
*Assistant Examiner*—Malcolm Cribbs
(74) *Attorney, Agent, or Firm*—Mitch Harris, Atty at Law, LLC; Andrew M. Harris; Casimer K. Salys (57) ABSTRACT

A method and system for energy management in a simultaneous multi-threaded (SMT) processing system including per-thread device usage monitoring provides control of energy usage that accommodates thread parallelism. Per-device usage information is measured and stored on a per-thread basis, so that upon a context switch, the previous usage evaluation state can be restored. The per-thread usage information is used to adjust the thresholds of device energy management decision control logic, so that energy use can be managed with consideration as to which threads will be running in a given execution slice. A device controller can then provide for per-thread control of attached device power management states without intervention by the processor and without losing the historical evaluation state when a process is switched out. The device controller may be a memory controller and the controlled devices memory modules or banks within modules if individual banks can be power-managed. Local thresholds provide the decision-making mechanism for each controlled device and are adjusted by the operating system in conformity with the measured usage level for threads executing within the processing system. The per-thread usage information may be obtained from a performance monitoring unit that is located within or external to the device controller and the usage monitoring state is then retrieved and replaced by the operating system at each context switch.

20 Claims, 5 Drawing Sheets

U.S. PATENT DOCUMENTS

| | | |
|---|---|---|
| 2001/0008391 A1* | 7/2001 | Yuasa .................... 340/310.01 |
| 2002/0004913 A1 | 1/2002 | Fung |
| 2003/0056200 A1* | 3/2003 | Li et al. ...................... 717/128 |
| 2003/0210247 A1 | 11/2003 | Cui et al. |
| 2004/0044914 A1 | 3/2004 | Gedeon |
| 2004/0083478 A1 | 4/2004 | Chen et al. |
| 2004/0163000 A1* | 8/2004 | Kuhlmann et al. ......... 713/300 |
| 2004/0216113 A1* | 10/2004 | Armstrong et al. ......... 718/104 |
| 2004/0221114 A1* | 11/2004 | Devassy et al. ............ 711/151 |
| 2004/0236896 A1 | 11/2004 | Kanapathippillai et al. |
| 2004/0254765 A1* | 12/2004 | Lee et al. ................... 702/186 |
| 2004/0260957 A1 | 12/2004 | Jeddeloh et al. |
| 2005/0125701 A1 | 6/2005 | Van Hensbergen et al. |
| 2005/0125702 A1 | 6/2005 | Keller et al. |
| 2005/0125703 A1 | 6/2005 | Lefurgy et al. |
| 2005/0132238 A1* | 6/2005 | Nanja ........................ 713/300 |
| 2005/0160151 A1 | 7/2005 | Rawson, III et al. |

* cited by examiner

METHOD AND SYSTEM FOR ENERGY MANAGEMENT IN A SIMULTANEOUS MULTI-THREADED (SMT) PROCESSING SYSTEM INCLUDING PER-THREAD DEVICE USAGE MONITORING

CROSS-REFERENCE TO RELATED APPLICATIONS

The present application is related to previously-filed co-pending U.S. patent applications Ser. No. 10/727,319, entitled "METHOD AND SYSTEM FOR POWER MANAGEMENT INCLUDING DEVICE CONTROLLER-BASED DEVICE USE EVALUATION AND POWER-STATE CONTROL" filed on Dec. 3, 2003, and Ser. No. 10/727,318, entitled "METHOD AND SYSTEM FOR ENERGY MANAGEMENT VIA ENERGY-AWARE PROCESS SCHEDULING" the specifications of which are herein incorporated by reference.

BACKGROUND OF THE INVENTION

1. Technical Field

The present invention relates generally to energy management in processing systems, and more particularly, to energy management within a multi-threaded processing system.

2. Description of the Related Art

Present-day computing systems include both single-threaded (uniprocessor) processing systems and simultaneous multi-threaded (SMT) processing systems. In the past, SMT processing systems have typically been restricted to large server systems and dedicated mainframe systems, but with the advent of desktop computer operating systems that support multiple simultaneous thread execution and processor technology that permits integration of multiple processor cores within a single integrated circuit, SMT processors are likely to appear within desktop and notebook computing systems in the very near future. In large fixed-location systems and small portable systems, energy management has become increasingly important for battery energy management in portable systems, and for power dissipation management in all computing systems. Recent designs push the envelope of power dissipation both within processor integrated circuits, and within the total system package.

SMT processors provide very efficient use of processor resources, as multiple threads may simultaneously use processor resources. Multiple threads are concurrently executed in an SMT processor so that multiple processor execution units, such as floating point units, fixed point instruction units, load/store units and others can be performing tasks for one (or more depending on the execution units' capabilities) of multiple threads simultaneously. SMT processors also may simultaneously use external resources, such as memory and peripheral devices. The simultaneous use raises the difficulty of determining how resources are used by an individual thread, as within a given execution slice, multiple threads may access an external device.

The above-incorporated patent applications disclose methods and systems for energy management that provide a fine level of control of power use by memory modules and other devices within a processing system by providing device controllers that measure the use of a resource and automatically take the resource off-line (i.e., place the device in a power saving state or cut power to the device), when the device is being infrequently accessed, or is likely to be infrequently accessed based on a next scheduled process. The power management schemes disclosed in the above-incorporated patent applications include per-process measurement of device usage in order to inform the energy management decision making process. However, in an SMT system, the scheduler will schedule execution of multiple threads at each execution slice, and so the assumption of per-process collection of information based on measuring device usage during is no longer accurate, as multiple threads can access the same device such as a memory module during a given execution slice and when another execution slice is scheduled, the same threads may not be executing.

It is therefore desirable to provide a method and system for providing energy management within an SMT processing system, that can reduce power consumption by placing resources that are used infrequently for a given "next" thread set in a power-saving state, while providing high processing throughput by maintaining low resource latency for resources that are likely to be used frequently for the next thread set.

SUMMARY OF THE INVENTION

The objective of reducing power consumption by placing infrequently used resources in a power-saving state for a next thread set while maintaining low latency for frequently used resources for the next thread set is provided in a method and system, as well as device controllers and performance monitors provide a mechanism for implementing the method and system.

The method and system provide per-device usage evaluators within one or more performance monitor units or a device controller that monitor the use of connected devices on a per-thread basis. The state of the usage evaluators is saved at each context switch, providing a quasi-continuous measurement of device use by each thread. When a next set of threads is scheduled for execution, the previous usage measurement state for those threads is restored to the usage evaluators. A device controller, such as memory controller provides energy-management control registers and per-device usage evaluators. The per-device power-management registers are populated with power management settings for each device controlled by the device controller at each context switch and thresholds set for automatically changing the power management state of each individual device in conformity with the device usage level, thereby providing for intelligent and independent power management of each device without intervention by the operating system and processor(s). The thresholds are set in conformity with thread usage information determined from the per-thread usage monitors, so that a set of thresholds appropriate to the set of threads scheduled for execution in the next execution slice provide more effective energy management in the SMT processing system.

The device controller can be a memory controller, as mentioned above, the controlled devices can be memory modules coupled to the memory controller, and the per-thread usage evaluators may be located in a performance monitor unit (PMU) or within the device controller.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF ILLUSTRATIVE EMBODIMENT

The present invention concerns local control and evaluation of power management settings at the device controller level within a multi-threaded processing system. The above-incorporated patent application "METHOD AND SYSTEM FOR POWER MANAGEMENT INCLUDING DEVICE CONTROLLER-BASED DEVICE USE EVALUATION AND POWER-STATE CONTROL", provides a scheme for local control and evaluation of power management settings within a uni-processor system, but does not provide per-thread usage evaluation so that when a context switch occurs, power management settings can be made in conformity with an expected use of devices for the set of threads that will executed in the next execution slice.

The present invention provides for per-thread device usage measurement by providing a mechanism for reading and writing the state of a set of per-thread usage counters for each controlled device. Each device has an associated set of counters, one for each thread supported for execution by the multi-threaded processing system. So, if the processing system supports simultaneous execution of four threads, a set of four counters for each device is provided so that individual usage by each thread executed during a given execution slice can be determined. When a context switch occurs, the states of each of the counters is read and stored by the operating system (generally by a low-level operating system or hypervisor above which multiple operating system instances may be executing). Thus the hypervisor software accumulates information about usage of devices for each active thread in the system, which is generally a number of threads much larger than the number of simultaneously executing threads. At a context switch, the hypervisor software determines which threads will be run in the next execution slice, and can retrieve current usage information for each device for the next set of threads. The usage information is used for two purposes: 1) to restore the states of the usage counters so as to provide quasi-continuous measurement of device usage by the next set of threads, and 2) to provide input to the power management control scheme for predicting usage levels of the controlled devices for the next set of threads. The hypervisor software sets power management states or thresholds for the controlled devices via a power-management aware device controller that couples the controlled devices to the processing system.

Embodiments of the present invention include per-device usage counter sets that are incorporated within individual performance monitors, one for each thread, or within a single performance monitor. The usage counter sets may alternatively be incorporated within a device controller, such as a memory controller.

The illustrative embodiment provided herein is directed toward a memory controller coupled to memory modules and per-thread performance monitor units (PMUs), but it should be understood that the techniques of the present invention may also be applied to other devices and device controllers within a processing system, such as disk controllers, peripheral controllers and network/device hub controllers. It should be understood also that the PMUs may be a single PMU or may be entirely incorporated within the device controller(s). In general, controllers and devices for which there is a wait-time penalty incurred for recovery from a power saving state and in which no device responses are lost due to placing the device in a power-saving state (e.g., a hub or network controller that will wake on input) can provide reduced power usage through the techniques of the present invention.

Figure 1:
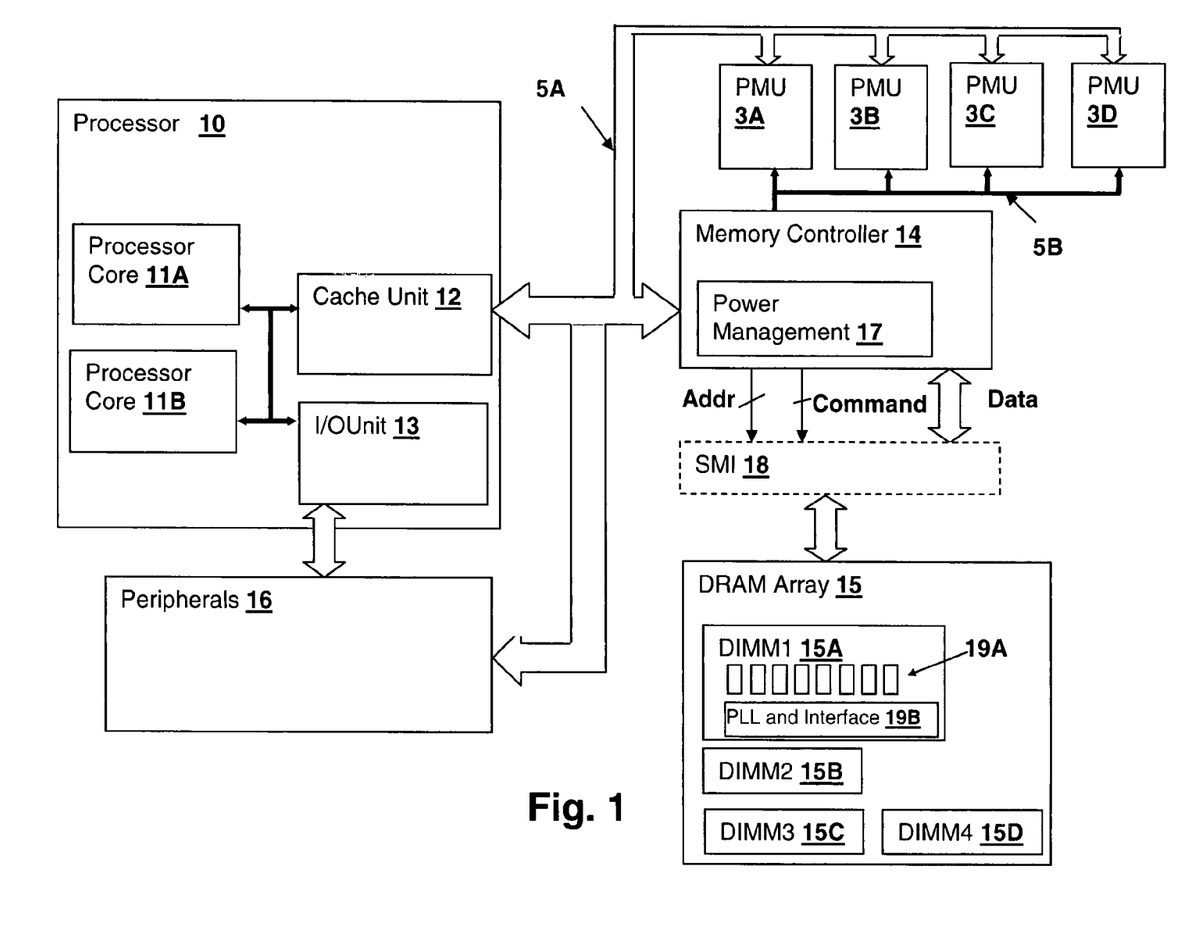
FIG. 1 is a block diagram of a simultaneous multi-threaded processing system in accordance with an embodiment of the invention.

With reference now to the figures, and in particular with reference to FIG. 1, there is depicted a block diagram of a simultaneous multi-threaded processing embodying a method and a system in accordance with the present invention. Memory controller 14 is coupled to a dynamic random-access memory (DRAM) array 15 and provides control signals in the form of address lines and command strobes. Memory controller 14 is also coupled to a processor 10 and peripherals 16 for storing and loading program instructions and data. As mentioned above, peripherals 16 may also include device controllers and controlled devices embodying the techniques and structures of the present invention, but for the purposes of illustration, the techniques and structures of the present invention will be described as embodied within the overall system of FIG. 1. Processor 10 includes two cores 11A and 11B each of which is capable of supporting simultaneous execution of two threads, so that four threads may be active within the system of FIG. 1 at any time. Cores 11A and 11B are coupled to one or more cache units 12 that generally provide the memory interface to memory controller 14 and also to an I/O unit 13 that provides for communication with peripherals 16 and device controllers such as memory controller 14.

Performance monitor units (PMUs) 3A–D include the per-thread usage counter sets mentioned above, as well as logic for determining which device is being accessed at each access event. PMUs 3A–D are coupled to memory controller 14 (and in other embodiments, other device controllers within peripherals 16) by a PMU bus 5B, which transfers event information and node numbers to PMUs 3A–D at each access made by memory controller 14. PMUs 3A–D are also coupled to system I/O bus 5A so that the hypervisor software can read and write the states of the internal usage counter sets.

Memory controller 14, as described in the above-referenced patent application, includes a power management unit 17 that stores power management settings for each memory module within DRAM array 15. In larger systems, multiple DRAM arrays 15 may be coupled to memory controller 14 by one or more Synchronous Memory Interfaces (SMIs) 18 which provide partitioning of the memory subsystem into large banks. If incorporated, SMIs 18 could also include some of the features of the present invention, such as per-thread and/or total usage counters/evaluators and/or control registers holding power settings for the memory nodes as described below. Therefore, any inclusion of portions of the structures techniques of the present invention within SMIs 18, should be understood as contemplated by the present invention, as SMIs 18 are device controllers within the context of the present invention.

DRAM array 15 includes multiple dual in-line memory modules (DIMMs) 15A–15D, each of which can be power-managed separately. Other power-management granularity is possible, such as powering down banks within DIMMs 15A–15D, if bank-level power management is possible. However, in general, power management at present is generally performed at the DIMM level. DIMMs 15A–15D each include memory devices 19A and interface circuits 19B that include a phase-lock loop (PLL) for synchronizing the memory device 19A with the DIMM bus interface to SMI 18 or memory controller 14. The power management states available for setting within DIMMs 15A–15D, vary based on design, but generally a standby state, a power down mode, and a self-refresh state are available, as well as a state in which power to the module is removed. In the self-refresh state, the external PLL within interface circuits 19B can be disabled. The PLL consumes a significant amount of the total power consumed by DIMMs 15A–15D, so the self-refresh state is a very desirable power management state, but the recovery time for the self-refresh state is very high, as the PLL must be reactivated and re-synchronize memory devices 19A with the external bus.

In order to effectively use selective DIMM power management, known techniques within the operating system memory manager are employed to effectively group allocated memory resources so that the resources are aggregated within the minimum number of memory modules as described in the above-referenced patent application. For SMT systems, the partitioning of memory modules by process will only be effective for power management if the hypervisor software generally schedules simultaneous execution of threads owned by the same process, otherwise, all of the modules could be in use simultaneously due to accesses by the multiple threads.

As in the above-referenced patent application, the present invention provides a device controller that determines usage information for each controlled device and saves usage evaluation states at the context switch, thereby isolating the evaluation of device use to each execution slice, while providing the ability to evaluate device use on more than a single execution slice. The device controller provides power management control via registers and threshold evaluators introduced within the memory controller, portions of which may be alternatively located within the SMIs or memory modules themselves. Local control of power management permits the device controller to issue power management control commands to the controlled devices. When the use of a device falls below a threshold, the device controller sends a command to lower the power usage state of the device, without requiring that the system processor(s) intervene in the power management decision.

However, in the present invention, the usage evaluators described in the above-referenced patent application are used to determine a total use of the associated device by all threads executing within an execution slice, as the power management logic is not thread-selective. Further counters are provided in addition to determine per-thread usage of associated devices to that power management can be tailored to each thread set that is executed in the processing system. The per-thread usage information is used to adjust the thresholds in memory controller and set the initial power management states of the devices, so that at each execution slice, appropriate power management settings are made for the next set of threads that are scheduled for execution.

Figure 2:
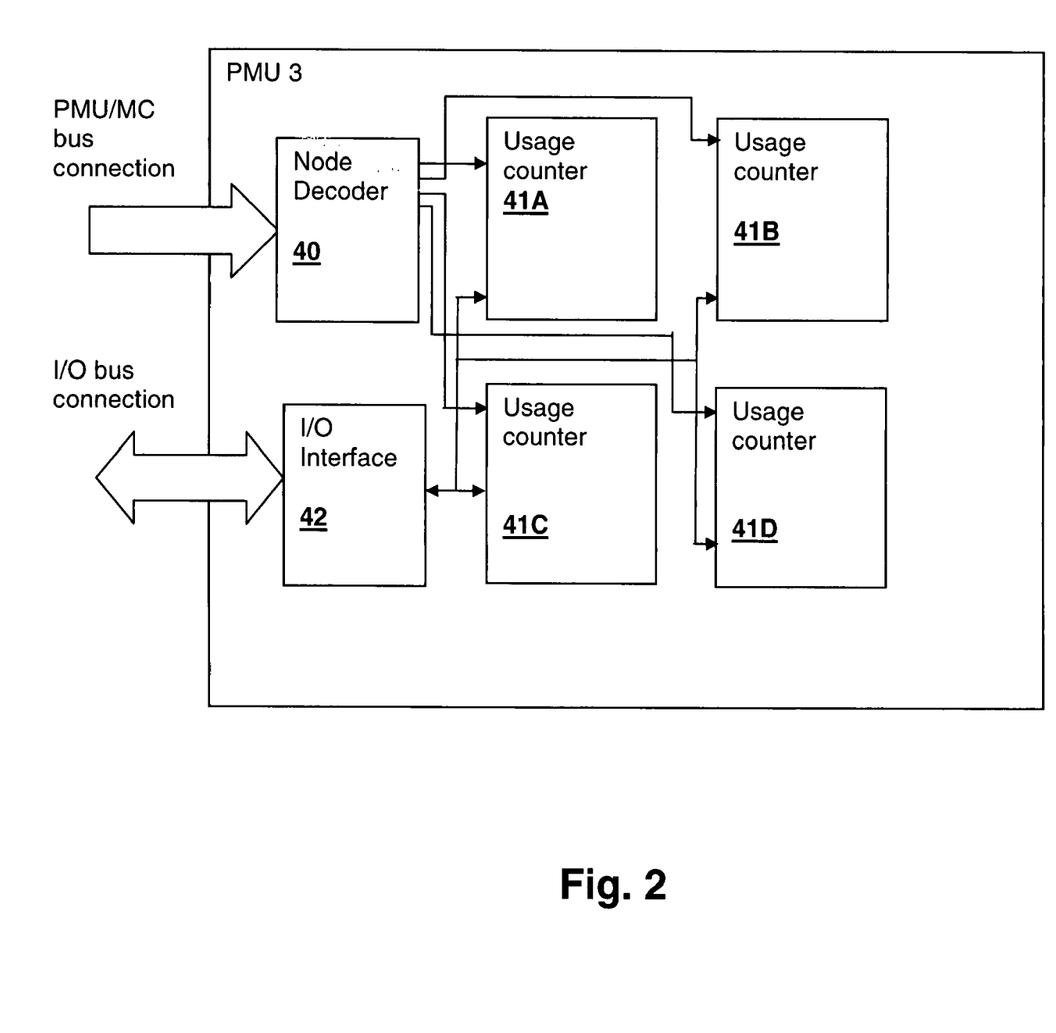
FIG. 2 is a block diagram depicting details of performance monitor units 19A–D of FIG. 1.

Referring now to FIG. 2, details of PMUs 3A–D are depicted in an exemplary PMU 3 in accordance with an embodiment of the present invention. PMU 3 includes a set of usage counters 41A–D each associated with a corresponding one of DIMMs 15A–D. A node decoder 40 determines which node an access event transmitted over PMU bus 5B corresponds to and selects the appropriate counters 41A–D for updating. Memory accesses are communicated to PMU 3 via PMU bus 5B in the form of events that are sent on separate sets of signals for each thread. In addition to the events, a module number is sent by the memory controller for each access over PMU bus 5B that enables node decoder 40 to select the appropriate usage counter 41A–D to updated for the memory module that is being accessed.

An I/O interface 42 provides a connection to processor 10 so that program instructions for reading the counter values and writing values to set the states of counters 41A–D can be implemented. As mentioned above, the depicted embodiment of PMU 3 is not intended to be limiting, and PMU 3 may include counters for each thread or may be integrated within a device controller. Additionally, counters 41A–D may be counters for measuring frequency of access in each execution slice (standard counters) or may be inter-arrival time counters as used in the memory controller power management unit of the above-referenced patent application and as reiterated below with respect to the details of that memory controller.

Figure 3:
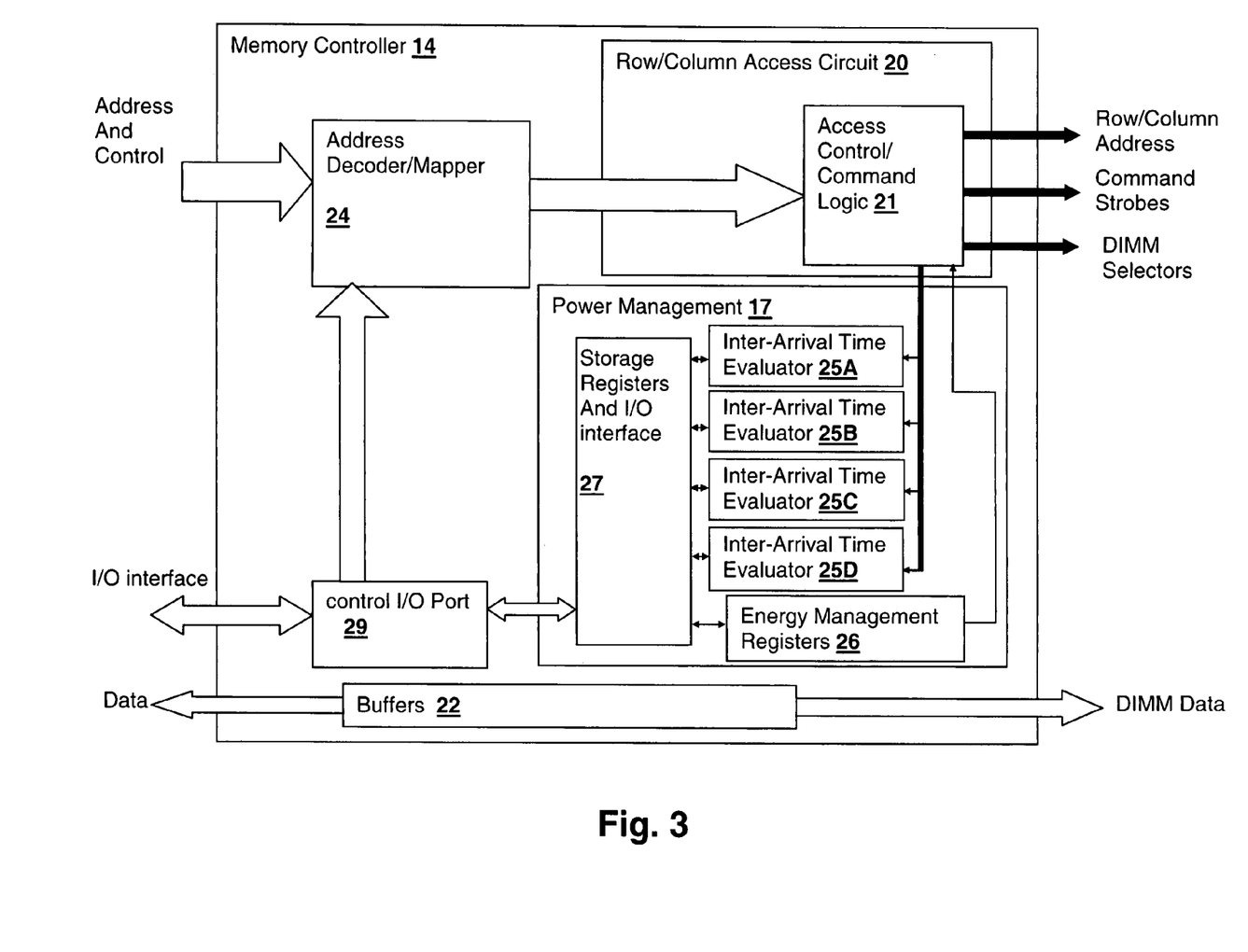
FIG. 3 is a block diagram depicting details of memory controller 14 of FIG. 1.

Referring now to FIG. 3, details of memory controller 14 are depicted in accordance with an embodiment of the present invention. FIG. 3 is also used generally to describe various embodiments of the present invention in the form of alternative structures in which some internal blocks will be mentioned as optionally located in SMIs or memory modules as described above.

Address and control signals are provided to an address decoder/mapper 24 from processor core 10, peripherals 16 or may be generated internally in the case of refresh or cache control implementations. Address decoder/mapper 24 provides signals to a row/column access circuit 20 that provides command strobes, and DIMM selectors as well as column/row address signals to DIMMs 15A–D via access control/command logic 21 for performing memory accesses. Access control/command logic also forwards commands from power management unit 17 to DIMMs 15A–D for setting power management states of individual DIMMs 15A–D. In embodiments where access counters are provided within DIMMs 15A–D, commands are also forwarded to retrieve the access counts for use by power management unit 17. Memory controller 14 also includes data buffers 22 for buffering data transferred to and from DIMMs 15A–D, as well as a control I/O port 29 for receiving control information from processor core 10, as well as providing register read ports from which processor core 10 can retrieve the current status of memory controller 14. Additionally, control I/O port 29 provides access to registers within power management unit by processor core 10 as will be described in detail below.

Power management unit 17 includes a plurality of energy management registers 26, provided on a per-device basis (one set for each of DIMMs 15A–D in the depicted embodiment). The values set in energy management registers 26 provide for control of power management states of DIMMs 15A–D and may include direct state setting values, overriding local control by power management unit 17, as well as control of the states to which power management unit 17 can set a particular DIMM. Thresholds may also be programmed via energy management registers 26, as well as the type of thresholds to be applied, if multiple threshold types are supported by the power management logic. In general, threshold values may be a single fixed threshold, in which the current inter-arrival time (or other significant indicator of memory use such as access frequency) of memory accesses for a given process and module is compared to a level programmed by the operating system. When the inter-arrival time exceeds the predetermined threshold, the particular module is placed in a lower-power operating mode by the device controller via access control and command logic 21. Alternatively, an adaptive threshold may be selected and the threshold adaptively adjusted by power management unit 17 logic so that the threshold level is adjusted based on historical access to the module by the process, or adjusted based on accesses to other modules (power prioritization for limited power allocation schemes).

Both the threshold values and types, as well as the initial power management state for each execution slice is set during the context switch by the hypervisor software. The values of the thresholds and control registers are determined from historical values retrieved from PMUs 19A–D and stored in system memory. When a new set of threads is to be scheduled for execution, the per-thread usage values are retrieved and used to determine a new set of thresholds and control register settings in order to provide effective power management states for the next execution slice.

Power management unit 17 also includes inter-arrival time evaluators 25A–D that statistically measure the inter-arrival time for each of DIMMs 15A–D for the total of all accesses by all threads. As mentioned above, inter-arrival time evaluators 25A–D could be located in DIMMS or the DIMMS could include counters that evaluators 25A–D use to update their statistics, and if so implemented, may be read by power management unit 17 via commands sent through access control/command logic 21. By whatever mechanism the inter-arrival counts and/or statistics are obtained, upon a context switch, indicated by processor core 10 via control I/O port 29, the state of the inter-arrival statistics may read and stored external to memory controller 14, and written to memory controller 14, but this is not required as it was in the above-referenced patent application, as per-thread set information is not necessarily useful. However, if thread sets are commonly repeated, this data could be used to more quickly estimate the proper power management and threshold settings in alternative to determining the new settings from the per-thread counters. Therefore, in general, it is not necessary to save or restore the state of inter-arrival evaluators 25A–D. Storage registers and I/O interface 27 provides the mechanism by which the operating system via a system processor can capture and store the state of evaluators 25A–D, and may be snapshot registers that capture the states of the evaluator for each device and temporarily the states until the operating system can store them, or may use simple output buffers that permit reading of the evaluator state directly. Storage registers and I/O interface 27 also provides an input port for writing values corresponding to a state of evaluators 25A–D. Control I/O port 29 provides the connection of I/O interface to an external bus for access by processor 10.

Figure 4:
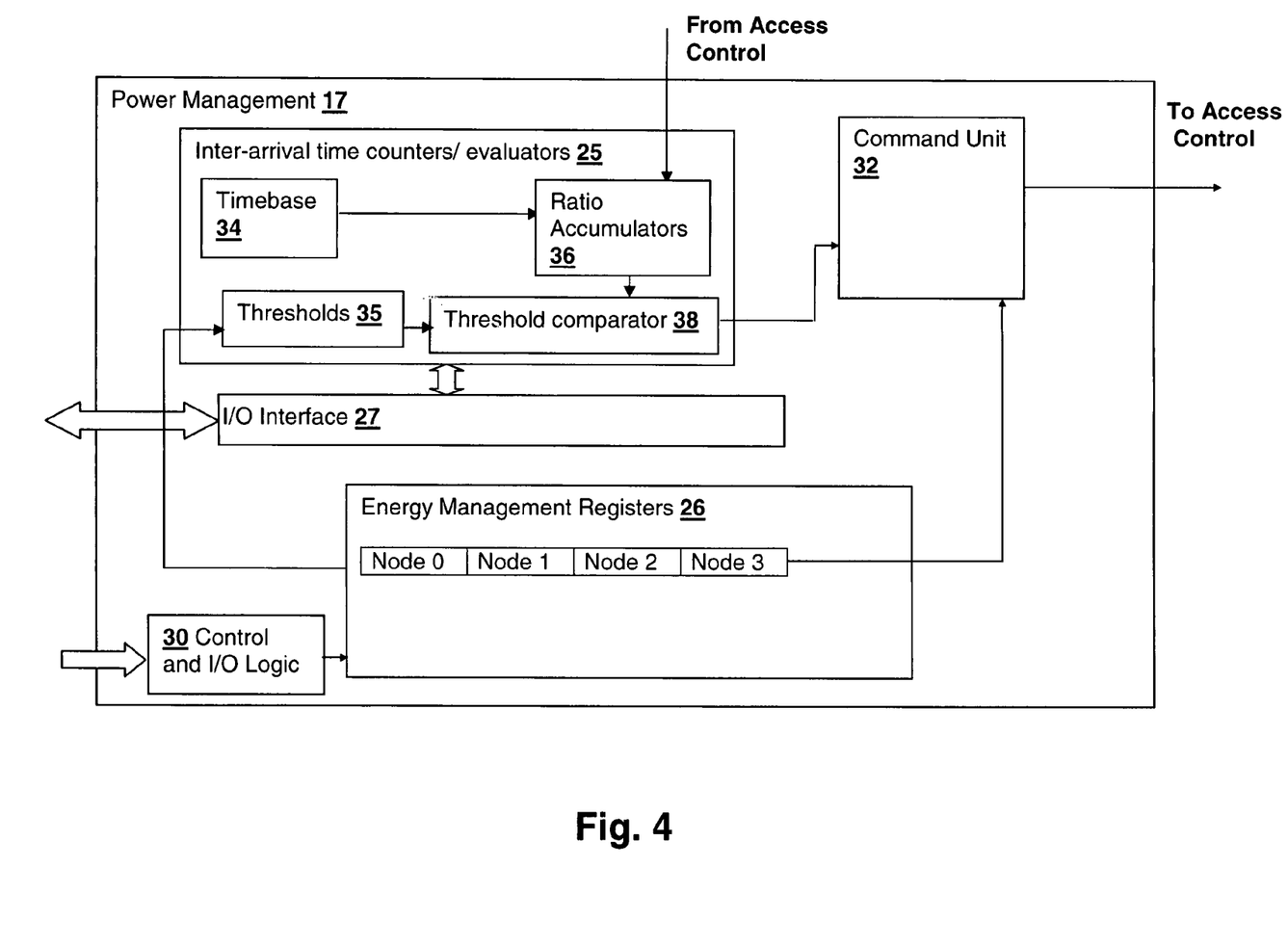
FIG. 4 is a block diagram depicting details of power management unit 17 of FIG. 2.

Referring now to FIG. 4, further details of power management unit 17 are depicted. Inter-arrival time counters/evaluators 25 for each node determine whether the infrequency of accesses to each node justifies setting a lower power management level and if such determination is made, commands are sent to DIMMS 15A–15D via command unit 32. As mentioned above, upon a context switch, the states of counters/evaluators 25 may be read via I/O interface 27 and can be are stored along with other state information (such as registers), as well as the per-thread counts read from PMUs 19A–D in buffers maintained by the operating system kernel. Previously stored states of per-thread usage counts from PMUs 19A–D that are associated with the next set of threads are retrieved from memory and used to determine settings that are and sent via I/O interface 27 to counters/evaluators 25 and energy management registers 26. Registers 26 are coupled to command unit 32 to apply any overrides of local control. Energy management registers 26 are also coupled to counters/evaluators 25 to apply any threshold information set by the operating system via threshold registers 35, the values of which are also determined from the per-thread usage counts for the next set of threads. Energy management registers 26 may also include energy management to selectively enable evaluators 25, in particular for turning off evaluators when local control is disabled, in order to conserve the power consumed by evaluators 25, but are also used to enable evaluators periodically when the system is in a power-conserving state.

Evaluators 25 compare a number of accesses performed for each device through access control 21 to a fixed timebase 34 via ratio accumulators 36, which estimate the inter-arrival time of accesses based on the frequency of accesses versus timebase 34 counts. A threshold comparator 38 compares the value of the ratio accumulator 36 to a fixed or adaptively derived threshold 35 and if the access inter-arrival time rises above the thredhold 35 value, directs command unit 32 to lower the power consuming state of the device, and command unit 32 directs command logic to do so if local control is enabled in the associated energy management register 26 for the device.

Figure 5:
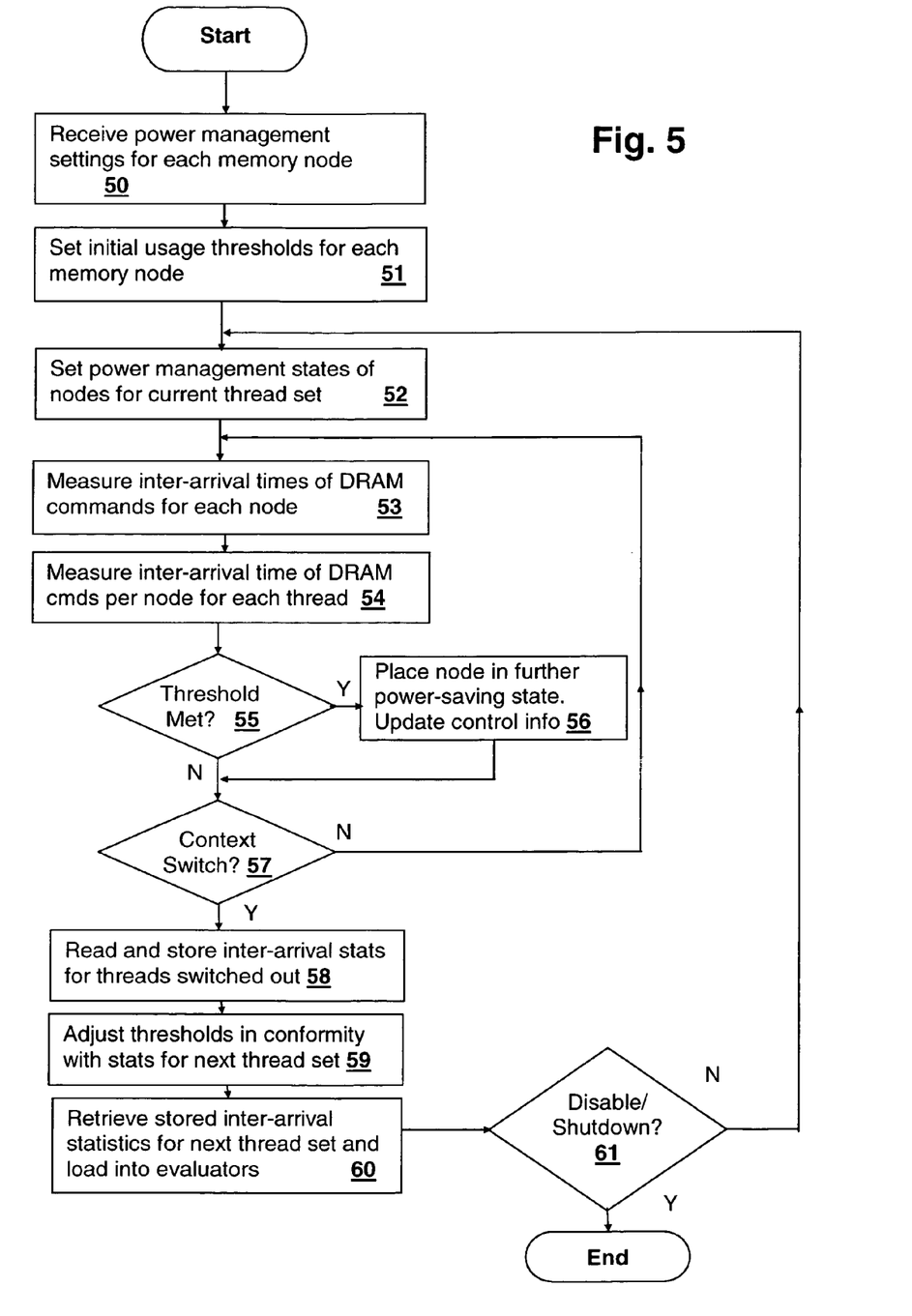
FIG. 5 is a flowchart depicting a method in accordance with an embodiment of the present invention.

Referring now to FIG. 5, a flowchart depicting a method in accordance with an embodiment of the invention is shown. First, memory controller 14 (or other unit incorporating the power management control mechanisms disclosed above) receives initial power management settings for each node (step 50) and sets the initial thresholds (step 51) and power management states for each node (step 52). Inter-arrival times are measured for each memory node during execution of the current process (step 53), as well as per-node individually for each thread (step 54). If a threshold value of inter-arrival time is met (decision 55), the memory module is placed in a lower power-consuming state (step 56) by the memory controller directly. Without intervention by the processor. Next, when a context switch occurs (decision 57), the inter-arrival time statistics are saved for the threads in the thread set being switched out (step 58) and the power management thresholds are adjusted in conformity with the statistics for the next thread set (step 59). The previously-saved statistics for the next thread set is built up and loaded into the usage counters (step 60). Until the scheme is disabled or the system shut down (decision 61), the new power management states are set for the thread set being activated, i.e., the new current thread set (step 52) and steps 52–60 are repeated.

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. A method for managing energy use in a multi-threaded processing system, said method comprising:
    first measuring a per-thread usage of a device by each thread in a first set of multiple threads concurrently executing within said multi-threaded processing system, said measured usage comprising an indicator for each of said multiple threads, wherein said device is a device coupled to and external to a processor executing said first set of multiple threads;
    storing said measured per-thread usage for each of said first set of threads;
    determining a next set of threads scheduled for execution;
    retrieving a previously-stored per-thread measured usage of said device corresponding to said next set of threads;
    predicting a usage of said device by said next set of threads in conformity with said retrieved usage; and
    sending a power management command to said device in conformity with a result of said predicting, whereby a power management state of said device is set in conformity with said previously-stored measured usage corresponding to said next set of threads.

2. The method of claim 1, further comprising setting a state of said first measuring for said next set of threads in conformity with a result of said retrieving and determining.

3. The method of claim 1, further comprising:
    setting a threshold level of total usage for said device in conformity with said retrieved previously-stored measured usage for said next set of threads;
    second measuring a total usage of said device by all of said next set of threads; and
    second determining whether or not said total usage has fallen below said threshold, and wherein said sending is performed in response to a result of said second determining.

4. The method of claim 3, wherein said first measuring comprises collecting per-thread counts of accesses to said device in one or more performance monitor units, wherein said second measuring comprises counting total accesses to said device within a device controller coupled to said device, wherein said second determining is performed within said device controller, and wherein said sending is performed automatically in response to said second determining, whereby said power management state of said device is set automatically by said device controller without intervention by a processor of said processing system.

5. The method of claim 1, wherein said device is a memory module, wherein said sending sends power management setting information to said memory module, wherein said first measuring determines a frequency of accesses to said memory module by each of multiple threads, and wherein said second measuring determines an overall frequency of access to said memory module by all of said next set of threads.

6. The method of claim 1, wherein said first measuring comprises collecting per-thread counts of accesses to said device within a device controller coupled to said device, wherein said second measuring comprises counting total accesses to said device within said device controller, wherein said second determining is performed within said device controller, and wherein said sending is performed automatically in response to said second determining, whereby said power management state of said device is set automatically by said device controller without intervention by a processor of said processing system.

7. A multi-threaded processing system, comprising:
    at least one processor core capable of simultaneous execution of multiple threads;
    a memory coupled to said processor for storing program instructions and data values for each of said multiple threads;
    a device controller coupled to said processor;
    one or more controlled devices coupled to said device controller, wherein said controlled devices have multiple power management states; and
    a per-thread usage monitor coupled to said device controller for determining a usage of said one or more controlled devices for each thread in a first set of threads concurrently executing within said multi-threaded processing system and further having an output port coupled to said at least one processor core, whereby said at least one processor core retrieves values of said per-thread usage monitor and stores said values in said memory at a context switch, wherein said at least one processor core retrieves previously stored per-thread device usage values corresponding to a next set of threads scheduled for execution in a next execution slice and predicts a usage of said device by said next set of threads in conformity with said retrieved usage, wherein said device controller includes a command unit for sending commands to said one or more controlled devices, and wherein said command unit is controlled for said next execution slice in conformity with said predicted usage of said device by said next set of threads.

8. The multi-threaded processing system of claim 7, wherein said per-thread usage monitor further has an input port coupled to said at least one processor core, whereby said processor core further sets an initial state of said per-thread usage monitor for said next execution slice in conformity with said retrieved previously stored values.

9. The multi-threaded processing system of claim 7, wherein said device controller further comprises at least one total usage evaluator having an input coupled to an output of said command unit for evaluating a frequency of use of an associated controlled device, and control logic coupled to said usage evaluator and further coupled to an input of said command unit for sending power management commands in response to said usage evaluator detecting that a usage level of said associated device has fallen below a threshold level, whereby said device controller power manages said controlled device without intervention by said processor, and wherein said processor core programs said threshold level for said next execution slice in conformity with said retrieved previously stored values for said next set of threads.

10. The multi-threaded processing system of claim 7, wherein said device controller is a memory controller, and wherein said controlled devices are memory modules.

11. The multi-threaded processing system of claim 7, wherein said per-thread usage monitor is included within a performance monitor unit coupled to said device controller.

12. The multi-threaded processing system of claim 7, wherein said per-thread usage monitor comprises a plurality of performance monitor units, each associated with a particular one of said multiple threads.

13. The multi-threaded processing system of claim 7, wherein said per-thread usage monitor is included within said device controller.

14. The multi-threaded processing system of claim 7, wherein said per-thread usage monitor comprises multiple sets of usage counters, each of said sets associated with one of multiple threads executing within said processing system and wherein each set comprises a usage counter for each of said controlled devices, whereby a usage count of each device for each thread is maintained.

15. A computer program product comprising signal-bearing media encoding program instructions for execution within a multi-threaded processing system, said program instructions comprising program instructions for:
- first retrieving per-thread usage of a device from a hardware performance monitor that measures usage of said device by each thread in a first set of multiple threads concurrently executing within said multi-threaded processing system, said measured usage comprising an indicator for each of said multiple threads, and wherein said device is external to a processor executing said multiple threads and is coupled to said processor by a device controller;
- storing said measured per-thread device usage for each of said first set of threads;
- determining a next set of threads scheduled for execution;
- second retrieving previously-stored per-thread measured device usages corresponding to said next set of threads;
- predicting a usage of said device by said next set of threads in conformity with said retrieved usage; and
- sending control information to said device controller in conformity with a result of said predicting, whereby a power management state of said device is set in conformity with said stored measured usage corresponding to said next set of threads.

16. The computer program product of claim 15, wherein said program instructions further comprise program instructions for setting a state of said hardware performance monitor for said next set of threads in conformity with a result of said retrieving and determining.

17. The computer program product of claim 15, wherein said program instructions for sending comprise program instructions for setting, within said device controller, a threshold level of total usage for said device in conformity with said retrieved previously-stored per-thread measured device usage for said next set of threads, whereby said power management state of said device is set automatically by said device controller in conformity with said set threshold.

18. The computer program product of claim 15, wherein said program instructions for first retrieving comprise program instructions for reading collected per-thread counts of accesses to said device from one or more performance monitor units.

19. The computer program product of claim 15, wherein said device is a memory module, and wherein said first retrieving retrieves a frequency of accesses to said memory module by each of multiple threads from a performance monitor that measures memory accesses to said module, and wherein said sending send commands to a memory controller that controls a power management state of said memory module.

20. The computer program product of claim 15, wherein said device is a memory module, and wherein said first retrieving retrieves a frequency of accesses to said memory module by each of multiple threads from a memory controller that controls access to said memory module, and wherein said sending send commands to said memory controller, whereby said memory controller controls a power management state of said memory module in conformity with a result of said first retrieving.

* * * * *